(12) United States Patent
Shellhammer et al.

(10) Patent No.: US 8,929,293 B2
(45) Date of Patent: Jan. 6, 2015

(54) TRANSMITTER CHARACTERISTIC REPRESENTATION FOR TELEVISION WHITE SPACE

(71) Applicant: Qualcomm Incorporated, San Diego, CA (US)

(72) Inventors: Stephen J Shellhammer, Ramona, CA (US); Santosh P Abraham, San Diego, CA (US); Vincent K Jones, Redwood City, CA (US)

(73) Assignee: Qualcomm Incorporated, San Diego, CA (US)

( * ) Notice: Subject to any disclaimer, the term of this patent is extended or adjusted under 35 U.S.C. 154(b) by 151 days.

(21) Appl. No.: 13/668,074

(22) Filed: Nov. 2, 2012

(65) Prior Publication Data

US 2013/0155971 A1 Jun. 20, 2013

Related U.S. Application Data

(60) Provisional application No. 61/577,735, filed on Dec. 20, 2011.

(51) Int. Cl.
*H04W 4/00* (2009.01)
*H04W 72/04* (2009.01)
*H04W 16/14* (2009.01)

(52) U.S. Cl.
CPC .......... *H04W 72/04* (2013.01); *H04W 72/0453* (2013.01); *H04W 72/044* (2013.01); *H04W 72/0406* (2013.01); *H04W 16/14* (2013.01)
USPC .......................................... 370/328; 370/329

(58) Field of Classification Search
CPC ............ H04W 72/04; H04W 72/0406; H04W 72/044; H04W 72/0453

USPC ................................................... 370/328, 329
See application file for complete search history.

(56) References Cited

U.S. PATENT DOCUMENTS

| | | | |
|---|---|---|---|
| 8,060,104 B2 | 11/2011 | Chaudhri et al. | |
| 2010/0330919 A1 | 12/2010 | Gurney et al. | |
| 2011/0310816 A1* | 12/2011 | Kim et al. | 370/329 |
| 2012/0106364 A1 | 5/2012 | Kasslin et al. | |
| 2012/0165056 A1* | 6/2012 | Kim et al. | 455/509 |
| 2013/0115984 A1* | 5/2013 | Schmidt et al. | 455/501 |
| 2013/0301556 A1* | 11/2013 | Porat | 370/329 |
| 2013/0311669 A1* | 11/2013 | Reimers et al. | 709/231 |

FOREIGN PATENT DOCUMENTS

WO 2011093642 A2 8/2011

OTHER PUBLICATIONS

Ecclesine P (CISCO): "Spectrum Mask Descriptor Examples; 11-11-1349-00-00af-spectrum-mask-descriptor-examples", IEEE Draft; 11-11-1349-00-00AF-Spectrum-Mask-Descriptor-Examples, IEEE-SA Mentor, Piscataway, NJ USA, vol. 802.11af, Sep. 25, 2011, pp. 1-4, XP017673463.
International Search Report and Written Opinion—PCT/US2012/071048—ISA/EPO—Apr. 29, 2013.

(Continued)

*Primary Examiner* — Farah Faroul
(74) *Attorney, Agent, or Firm* — S. Hossain Beladi

(57) ABSTRACT

A method includes sending, from a wireless device, an information element including at least one transmitter characteristic field. The at least one transmitter characteristic field includes information regarding a spectral mask associated with the wireless device and information regarding an antenna gain associated with the wireless device.

33 Claims, 9 Drawing Sheets

(56) References Cited

OTHER PUBLICATIONS

Shellhammer, S., et al., "Representation of Transmitter Characteristics; 11-11-1624-00-00af-representation-of-transmitter-characteristics", IEEE Draft; 11-11-1624-00-00AF-Representation-of-Transmitter-Characteristics, IEEE-SA Mentor, Piscataway, NJ USA, vol. 802.IIaf, Dec. 20, 2011, pp. 1-13, XP017673003.

Shellhammer, et al., "Technical Challenges for Cognitive Radio in the TV White Space Spectrum", Information Theory and Applications Workshop, Feb. 2009, pp. 323-333.

Le Nir, et al., "Autonomous Dynamic Spectrum Management for Coexistence of Multiple Cognitive Tactical Radio Networks", Cognitive Radio Oriented Wireless Networks & Communications (CROWNCOM), 2010 Proceedings of the Fifth International Conference, Jun. 2010, pp. 1-5.

* cited by examiner

TRANSMITTER CHARACTERISTIC REPRESENTATION FOR TELEVISION WHITE SPACE

CROSS REFERENCE TO RELATED APPLICATIONS

The present application claims priority from commonly owned U.S. Provisional Patent Application No. 61/577,735 filed Dec. 20, 2011, the content of which is expressly incorporated herein by reference in its entirety.

FIELD OF THE DISCLOSURE

The present disclosure is generally related to television white space data communications.

BACKGROUND

In many countries, wireless transmission frequency bands are regulated by a government regulatory agency. For example, in the United States, the Federal Communications Commission (FCC) regulates wireless transmission frequency bands and in the United Kingdom, the Office of Communications (Ofcom) regulates wireless transmission frequency bands. The FCC and similar regulatory agencies in other countries issue licenses to broadcast in particular frequency ranges. To illustrate, a television broadcaster may be licensed for television channel transmission for a particular channel defined within a particular frequency range in a particular geographic area.

As demand for wireless data communications has increased, some regulatory agencies have recognized that current licensing schemes may lead to inefficient use of the wireless transmission frequency spectrum. As a result, regulatory agencies have enacted rules to allow unlicensed users (such as individual consumers) to use licensed frequencies in "white spaces." A white space may generally refer to a frequency range (e.g., one or more channels) that is regulated but unused within a particular geographic area at a particular time. For example, the FCC recently made vacant/unused television (TV) white space spectrum available for unlicensed use to TV band devices (TVBDs). The FCC has also set guidelines that must be met in order for TVBD devices to use the TV white spaces.

SUMMARY

The TV white space spectrum in the U.S. includes TV channels in the range of 54 to 698 MHz. The FCC recognizes two kinds of TVBD devices, including a Mode I personal/portable TVBD ("Mode I device" or slave device) and a Mode II personal/portable TVBD ("Mode II device" or master device). The FCC and similar regulatory agencies in other countries do not require slave devices to have internal geolocation capability or to have access to a TV white space (TVWS) database to obtain a list of available channels (i.e., TVWS channels) for communication. However, master devices or access points must have internal geolocation capability (with 50 meter accuracy in the U.S.) and access to the TVWS database to obtain a list of available TVWS channels on which the master device and slave devices connected thereto can operate.

In order for the TVWS database to allocate one or more TVWS channels to the master device and slave devices, the TVWS database may require transmitter characteristics of a plurality of wireless devices (i.e., the master device and the slave devices) requesting TVWS channels. Transmitter characteristics may include spectral mask and antenna gain associated with the wireless devices. The TVWS database may use the spectral mask information alone or in conjunction with the antenna gain information to determine which TVWS channels the wireless devices may use and to allocate the one or more TVWS channels to the wireless devices, and possibly specify a maximum transmit power on each of those channels.

It may be advantageous to accurately and compactly represent the transmitter characteristic information so that the plurality of slave devices may send (e.g., via wireless transmission) individual transmitter characteristic information to the master device. The master device may then aggregate the transmitter characteristic information for the plurality of slave devices and for itself (i.e., the master device) and send (e.g., via wired or wireless transmission) the aggregated transmitter characteristic information to the TVWS database. The transmitter characteristic information may be included in an information element that includes one or more transmitter characteristic fields. Because TVWS channel allocation to the wireless devices (i.e., master device and slave devices) may depend on transmitter characteristic information provided to the TVWS database, a compact and accurate representation of the transmitter characteristic information may conserve wireless bandwidth.

In a particular embodiment, a method includes sending, from a wireless device, an information element including at least one transmitter characteristic field. The at least one transmitter characteristic field includes information regarding a spectral mask associated with the wireless device.

In another particular embodiment, a method includes receiving, at an electronic device, an information element including at least one transmitter characteristic field from a wireless device. The at least one transmitter characteristic field includes information regarding a spectral mask associated with the wireless device.

In another particular embodiment, an apparatus includes a processor and a memory including instructions executable by the processor to initiate sending of an information element including at least one transmitter characteristic field. The at least one transmission characteristic field includes information regarding a spectral mask associated with a wireless device.

In another particular embodiment, an apparatus includes a processor and a memory including instructions executable by the processor to detect receipt of an information element including at least one transmitter characteristic field from a wireless device. The at least one transmitter characteristic field includes information regarding a spectral mask associated with the wireless device and information regarding an antenna gain associated with the wireless device.

Other aspects, advantages, and features of the present disclosure will become apparent after review of the entire application, including the following sections: Brief Description of the Drawings, Detailed Description, and the Claims.

DETAILED DESCRIPTION

Figure 1:
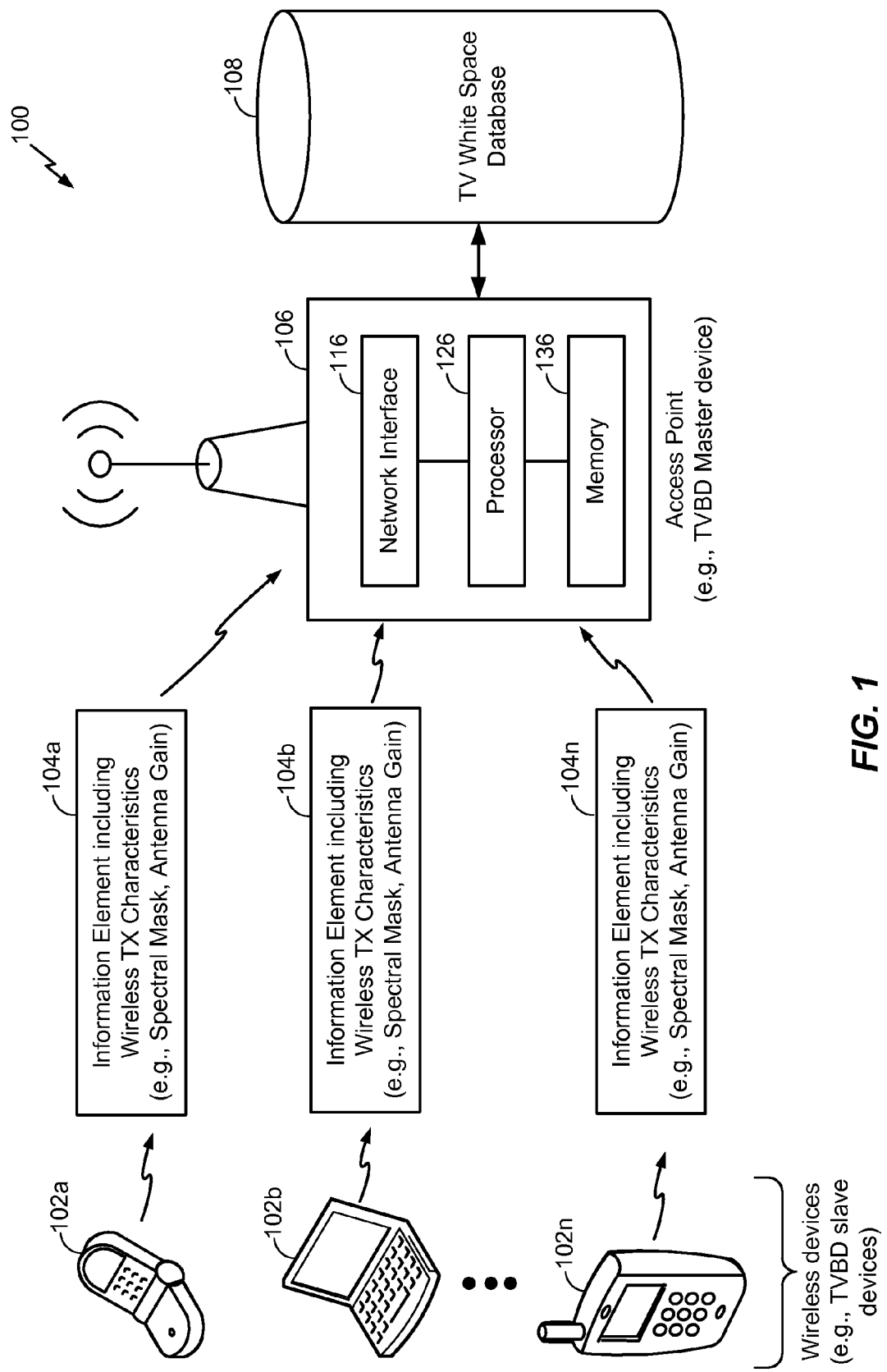
FIG. 1 is a block diagram of a particular illustrative embodiment of a system that is operable to represent transmitter characteristics in an information element.

Referring to FIG. 1, a block diagram of a particular illustrative embodiment of a system that is operable to represent transmitter characteristics in an information element is disclosed and generally designated 100. The system 100 includes a plurality of wireless devices 102a-102n coupled to an access point 106 (e.g., a TVBD master device) via a wireless communication network. In a particular embodiment, the plurality of wireless devices 102a-102n may include TVBD slave devices wirelessly coupled to the access point 106. In another particular embodiment, the plurality of wireless devices 102a-102n may include a mobile phone, a personal computer, a personal digital assistant (PDA), a music player, a video player, a set-top box, an entertainment unit, a navigation device, a communications device, a fixed location data unit, or any combination thereof.

The access point 106 may be coupled to a television white space (TVWS) database 108 via a wireless network connection or via a wired connection. The access point 106 may include a network interface 116, a processor 126, and a memory 136. In a particular embodiment, the TVWS database 108 may be configured to determine one or more channels to allocate to the access point 106 and to the plurality of wireless devices 102a-102n coupled to the access point 106. Thus, the TVWS database 108 may include processing logic and data storage. The access point 106 may include an Institute of Electrical and Electronics Engineers (IEEE) 802.11 (Wi-Fi) access point, an IEEE 802.16 (WiMAX) access point, a Flash-OFDM access point, an ultra mobile broadband (UMB) access point, a long term evolution (LTE) access point, an IEEE 802.20 (mobile broadband wireless access (MBWA) access point), a wireless wide area network (WWAN) access point, a wireless metropolitan area network (WMAN) access point, a wireless local area network (WLAN) access point, an evolved universal terrestrial radio access (E-UTRA) access point, and a low rate enabler (LRE).

Although a TVWS database 108 is shown, it should be noted that in some embodiments, the access point 106 may be coupled to a different electronic device configured to allocate one or more TVWS channels to the access point 106 and to the plurality of wireless devices 102a-102n (e.g., a channel granting electronic device). In a particular embodiment, the wireless devices 102a-102n and the access point 106 may include a television band (TVBD) device configured to operate (i.e., transmit) on one or more TVWS channels that are compliant with an IEEE 802.11af protocol.

During operation, the wireless devices 102a-102n may send information elements 104a-104n, each of which include transmitter characteristics associated with the corresponding wireless devices 102a-102n, to the access point 106 via wireless transmission. For example, the wireless device 102a may wirelessly transmit an information element 104a to the access point 106. In a particular embodiment, the information elements 104a-104n may include wireless transmission characteristics (e.g., spectral mask and maximum antenna gain) associated with the corresponding wireless device 102a-102n. A spectral mask may represent a frequency/amplitude transmission curve that a wireless device may "promise" not to exceed during transmission. The spectral mask may be intended to reduce adjacent channel interference by limiting excessive radiation at frequencies beyond a transmission bandwidth of a wireless device (e.g., to assure that a wireless device transmits within its channel). The spectral mask constraint may be placed on the device by a manufacturer of the wireless device or based on a standard (e.g., IEEE 802.11a/b/g/n/af).

Because the wireless device "promises" not to transmit at frequencies above the spectral mask, the spectral mask may be used to determine what channels may be allocated to the wireless device and what channels should not be allocated to the wireless device for communication. For example, if the wireless device has a "poor" spectral mask (i.e., its out-out-of-band (OOB) emissions radiate into adjacent frequencies), the wireless device may be prohibited from operating in a channel adjacent to an existing TV channel. Similarly, a maximum antenna gain (and other transmission characteristic information) associated with the wireless device may be used to determine one or more channels to allocate to the wireless device for communication. To illustrate, a first wireless device having a maximum antenna gain of 6 decibel isotropic (dBi) may be allocated a first channel and a second wireless device having a maximum antenna gain of 0 dBi may be allocated a second channel. Further, the wireless device may be required to transmit at a particular transmit power level (e.g., less than 1 W) if it is to operate at an allocated channel.

In a particular embodiment, information regarding the transmission characteristics (e.g., spectral mask and the maximum antenna gain) may be embedded in the wireless devices 102a-102n. For example, each of the wireless devices 102a-102n may store spectral mask and maximum antenna gain information associated with its transmitter in a read-only memory, a random access memory, or any other storage device of the wireless devices 102a-102n. Alternately, the wireless devices 102a-102n may each generate its transmitter characteristics. For example, the wireless devices 102a-102n may include processors configured to generate transmitter characteristics information including spectral mask and/or maximum antenna gain.

During operation, the wireless devices 102a-102n may send the information elements 104a-104n including transmitter characteristics to the access point 106 via a wireless network. The network interface 116 may receive the information elements 104a-104n (including the transmitter characteristics) from the wireless devices 102a-102n. The network interface 116 may be coupled to the processor 126, and the processor 126 may be coupled to a memory 136. In a particular embodiment, the processor 126 of the access point 106 may be configured to initiate sending of the information elements 104a-104n (or other packets or frames including transmitter characteristics) to the TVWS database 108. The processor 126 may also be configured to generate an information element including transmitter characteristics of the access point 106 and to initiate sending of the information elements 104a-104n and the information element of the access point 106 to the TVWS database 108.

In another particular embodiment, the processor 126 of the access point 106 may be configured to aggregate the information elements 104a-104n received from the wireless devices 102a-102n and the information element for the access point 106. For example, the processor 126 may aggregate the information elements 104a-104n and the information element of the access point 106 into a single information element (or other packets or frames including transmitter characteristics) that may be sent to the TVWS database 108 via the network interface 116. The memory 136 may be configured to store the information elements 104a-104n and the information element for the access point 106 before, during, and/or after aggregation. In a particular embodiment, the network interface 116 is a wireless network interface. Alternately or in addition, the network interface 116 may be a wired network interface.

The TVWS database 108 may be configured to determine, based on received transmitter characteristics information, one or more TVWS channels (e.g., 802.11af channels) available to the access point 106 and to the wireless devices 102a-102n for communication. In a particular embodiment, the TVWS database 108 may communicate an indication of the one or more available TVWS channels to the access point 106. The access point 106 may wirelessly communicate the indicated one or more available TVWS channels to the wireless devices 102a-102n. Thus, the TVWS database 108 may allocate TVWS channels to the access point 106 and to the wireless devices 102a-102n based on the received information elements (or single aggregated information element) that each includes transmitter characteristics (e.g., spectral mask and maximum antenna gain). Embodiments of representative information elements 104 are described in further details with reference to FIGS. 2-6.

Figure 2:
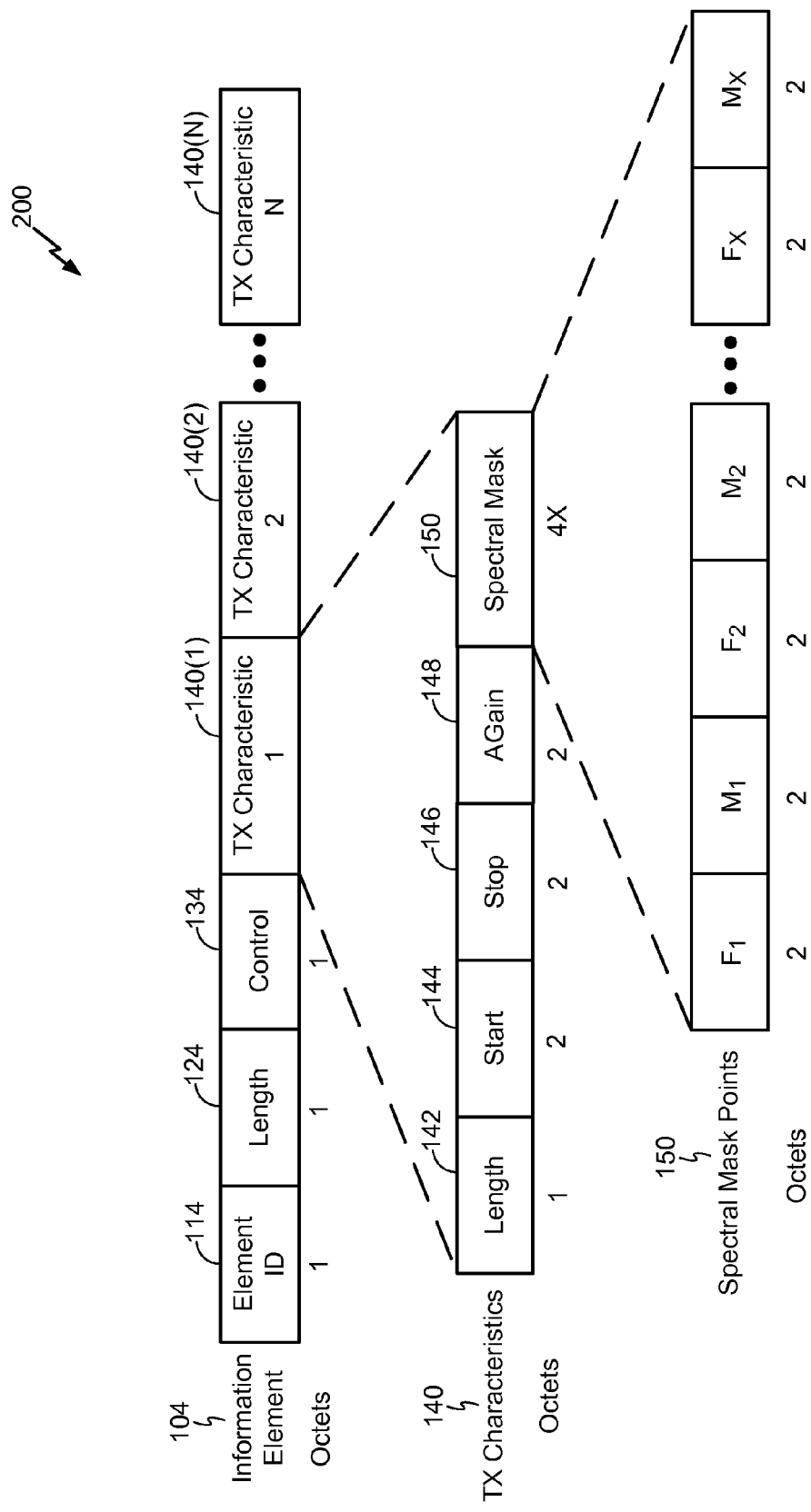
FIG. 2 is a diagram illustrating a particular embodiment of representing transmitter characteristics of a wireless device in an information element.

Referring to FIG. 2, a diagram illustrating a particular embodiment of an information element that represents transmitter characteristics of a wireless device is disclosed and generally designated 200. The information element 104 may include a plurality of fields including an element identification (ID) field 114, a length field 124, a control field 134, and at least one transmitter characteristic field 140(1)-140(N). The information element 104 represents an information element associated with any of the wireless devices 102a-102n and the access point 106.

Information indicated in each of the element ID field 114, the length field 124 and the control field 134 may be represented in one byte (i.e., 8 bits or one octet). The element ID field 114 may include information identifying the information element 104 (e.g., an identification number unique to the information element 104). The length field 124 may include information indicating a length of the information element 104. The control field 134 may include information indicating a format of the at least one transmitter characteristic field 140(1)-140(N). For example, the format may indicate an interpolation method for the spectral mask of the at least one transmitter characteristic, where the interpolation method includes linear interpolation, piecewise constant interpolation, polynomial interpolation, spline interpolation, cosine interpolation, cubic interpolation, Hermite interpolation, wavelet interpolation, or any combination. To illustrate "00000001" (i.e., '1') in the control field 134 may indicate that the interpolation format of the at least one transmission characteristic field 140a-140n is linear interpolation while a "00000010" (i.e., '2') may indicate polynomial interpolation.

In order to enable the TVWS database 108 to make a determination of the one or more TVWS channels to allocate to the wireless devices 102a-102n and to the access point 106, it may be necessary to provide sufficient transmitter characteristics associated with the wireless devices 102a-102n and the access point 106. In particular, it may be necessary to provide accurate information regarding the spectral mask and antenna gain associated with the wireless devices 102a-102n and the access point 106. Such detailed information may require large data sizes that may place a burden (e.g., power consumption, bandwidth space, memory, and other resources) on the wireless devices 102a-102n and the access point 106. Thus, it may be advantageous to compactly represent transmission characteristic information to save bandwidth without sacrificing accuracy of the information.

The information element 104 may include one or more transmission characteristic fields 140(1)-140(N), where each of the one or more transmission characteristic fields 140(1)-140(N) covers (i.e., corresponds to) a set of wireless channels (e.g., WLAN channels) in which the transmitting wireless device operates. Thus, the wireless device may provide information regarding its spectral mask and antenna gain for each of a set of wireless channels. The spectral mask may include two or more sets of points including a frequency component ('$F_x$') and the spectral mask component ('$M_x$'), where x is 1, 2, 3, . . . X depending on the number of spectral mask points provided.

To illustrate, a representative transmitter characteristic field includes a length field 142, a start field 144, a stop field 146, an antenna gain field 148, and a spectral mask field 150. The length field 142 may be an unsigned 8-bit integer (i.e., one byte or one octet) indicating a length of the transmission characteristic field 140. The start field 144 may indicate a start channel (e.g., a start channel number or frequency) in a WLAN channel spectrum and the stop field 146 may indicate a stop channel of the WLAN channel spectrum associated with the spectral mask 150 and antenna gain 148 of the wireless device within the band between the start channel and the stop channel. The start field 144 and the stop field 146 may each be an unsigned 16-bit integer (i.e., represented in two bytes or two octets). In a particular embodiment, the antenna gain 148 may be represented as a signed 16-bit integer indicating a maximum antenna gain of a transmitter of the wireless device. Further, the antenna gain may be represented in 0.01 decibel isotropic (dBi) resolution.

Figure 3:
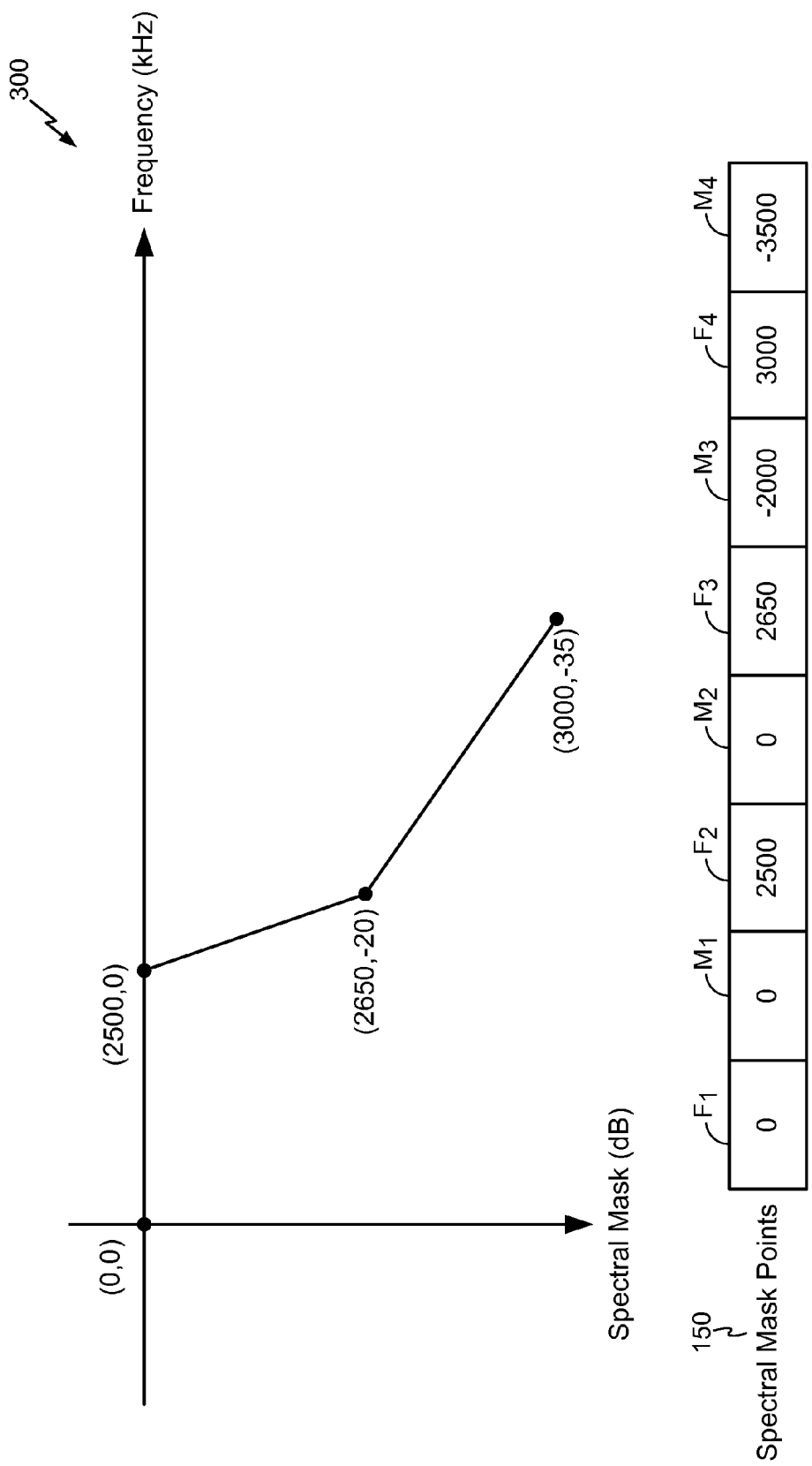
FIG. 3 is a diagram illustrating a particular example of spectral mask information in a transmitter characteristic field of the information element of FIG. 2.

In a particular embodiment, the spectral mask field 150 may include a plurality of sets of value pairs (i.e., spectral mask points) $\{\langle F_1,M_1 \rangle, \langle F_2,M_2 \rangle, \ldots \langle F_x,M_x \rangle\}$, where each value pair (i.e., spectral mask point) $\langle F_x,M_x \rangle$ includes a frequency value (i.e., $F_x$) and a spectral mask value (i.e., $M_x$). The frequency value may be measured at 1 kilohertz (kHz) resolution and the spectral mask value may be measured at 0.01 decibel (dB) resolution. In a particular embodiment, the frequency value may be represented as a 16-bit unsigned integer and the spectral mask value may be represented as a sixteen bit signed integer (e.g., to represent negative spectral mask values, as shown in FIG. 3). Thus, each spectral mask 150 point including the frequency value and the spectral mask value may be represented using 4 bytes (i.e., 4 octets including 2 octets for the frequency value and 2 octets for the spectral mask value). Accordingly, X spectral mask points may be represented in the transmission characteristic field using 4*X bytes (i.e., 4*X octets). FIG. 3 depicts a graph with 4 spectral mask points and is described below. In an alternate embodiment, N spectral mask points may be represented using 3*X bytes (i.e., 3*X octets), as described with reference to FIGS. 4 and 5.

Referring to FIG. 3, a diagram illustrating a spectral mask graph of the spectral mask points of FIG. 2 is disclosed and is generally designated 300. The spectral mask graph 300 includes four spectral mask points plotted in a graph. The x-axis represents the frequency component of the spectral mask measured at 1 kHz resolution and the y-axis represents the spectral mask measured at 0.01 dB resolution. For example, the four spectral mask points include the points $P_0$ (0,0), $P_1$ (2500,0), $P_2$ (2650,−20), and $P_3$ (3000,−35). In a particular embodiment, the spectral mask may be normalized. For example, the spectral mask value may be scaled to a maximum value of 0 dB. To illustrate, as shown in the spectral mask graph 300, the values for the y-axis (i.e., spectral mask in dB) are less than or equal to 0 dB.

Figure 4:
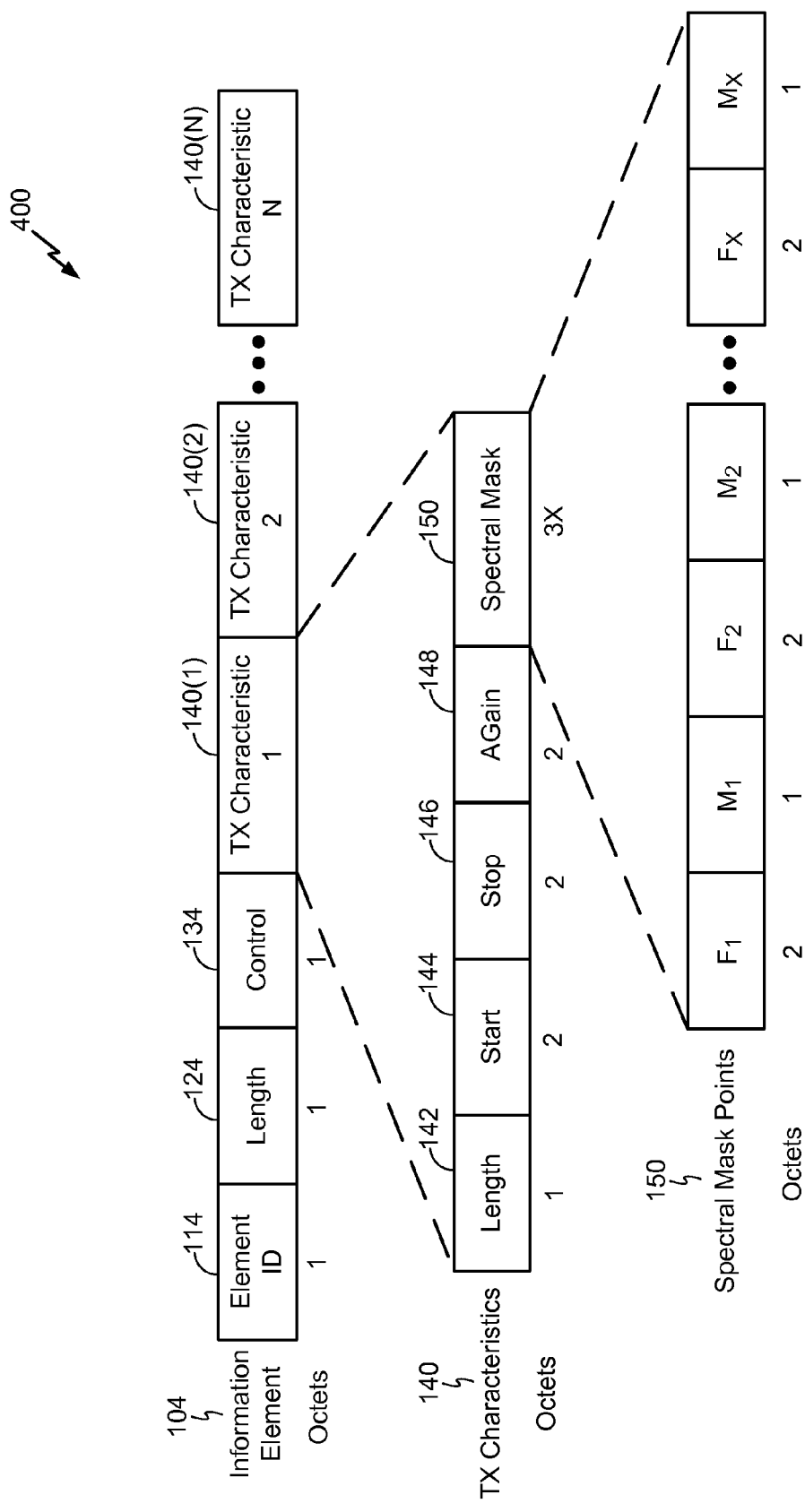
FIG. 4 is a diagram illustrating another particular embodiment of representing transmitter characteristics in an information element.

Referring to FIG. 4, a diagram illustrating another particular embodiment of an information element that represents transmitter characteristics of a wireless device is disclosed and generally designated 400. As described with reference to FIG. 2, the information element 104 may include a plurality of fields including the element ID field 114, the length field 124, the control field 134, and at least one transmitter characteristic field 140(1)-140(N).

The transmission characteristic field 140 includes the length field 142, the start field 144, the stop field 146, the antenna gain field 148, and the spectral mask field 150. In a particular embodiment, the spectral mask information for the wireless device may further be represented using 3 bytes (i.e., 3 octets), instead of the 4 bytes as shown in FIG. 2. To achieve a 3 byte representation of the spectral mask 150, the spectral mask value may be scaled so that the maximum value is 0 dB and the spectral mask resolution may be reduced from 0.01 dB to 1 dB.

Figure 5:
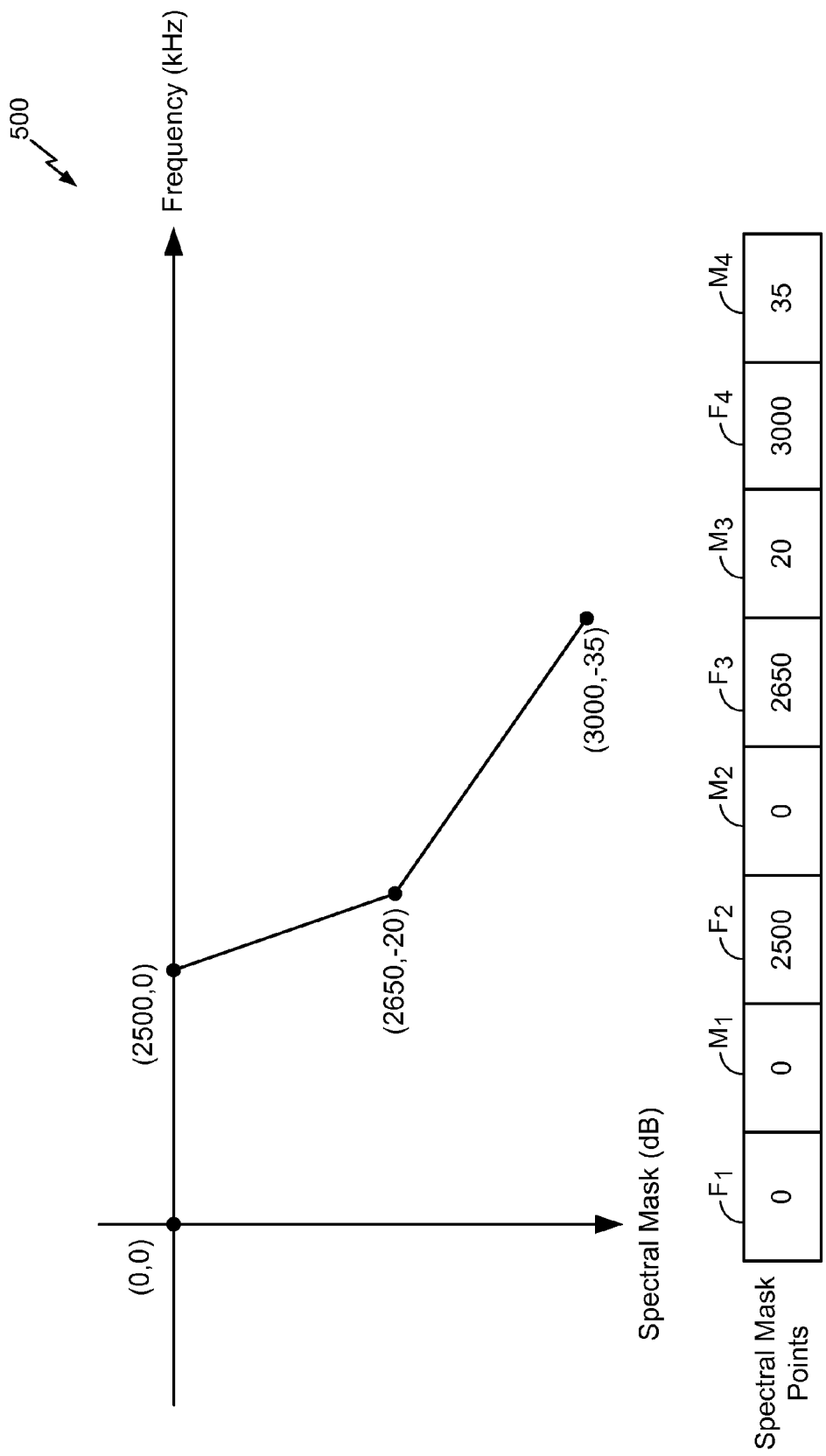
FIG. 5 is a diagram illustrating a particular example of spectral mask information in a transmitter characteristics field of the information element of FIG. 4.

In a particular embodiment, the spectral mask value may be represented using an 8-bit unsigned integer that represents a negative of the spectral mask value. Thus, the spectral mask 150 may include the frequency value measured at 1 kHz resolution (similar to the embodiment described with reference to FIG. 2) and the spectral mask value measured at a 1 dB resolution (compared to the 0.01 dB resolution of FIG. 2). Further, the frequency value may be represented as a 16-bit unsigned integer (similar to FIG. 2) resulting in a 3 byte (i.e., 3 octets) representation of the spectral mask. Thus, X spectral mask points may be represented in the transmission characteristic field 140 using 3*X bytes (or 3*X octets). FIG. 5 depicts a graph with 4 spectral mask points based on the embodiment described in FIG. 4.

Referring to FIG. 5, a diagram illustrating a spectral mask graph of the spectral mask points of FIG. 4 is disclosed and generally designated 500. The spectral mask graph 500 includes four spectral mask points plotted in a graph. The x-axis represents the frequency component of the spectral mask measured at 1 kHz resolution and the y-axis represents the spectral mask measured at 1 dB resolution, as described in FIG. 4. For example, the four spectral mask points including the points $P_0$ (0,0), $P_1$ (2500,0), $P_2$ (2650,−20), and $P_3$ (3000,−35) may be represented as $P_0$ (0,0), $P_1$ (2500,0), $P_2$ (2650, 20), and $P_3$ (3000, 35). It should be noted that the negative spectral mask values are represented as positive values. Thus, the 8-bit unsigned integer represents a negative of the spectral mask value.

Figure 6:
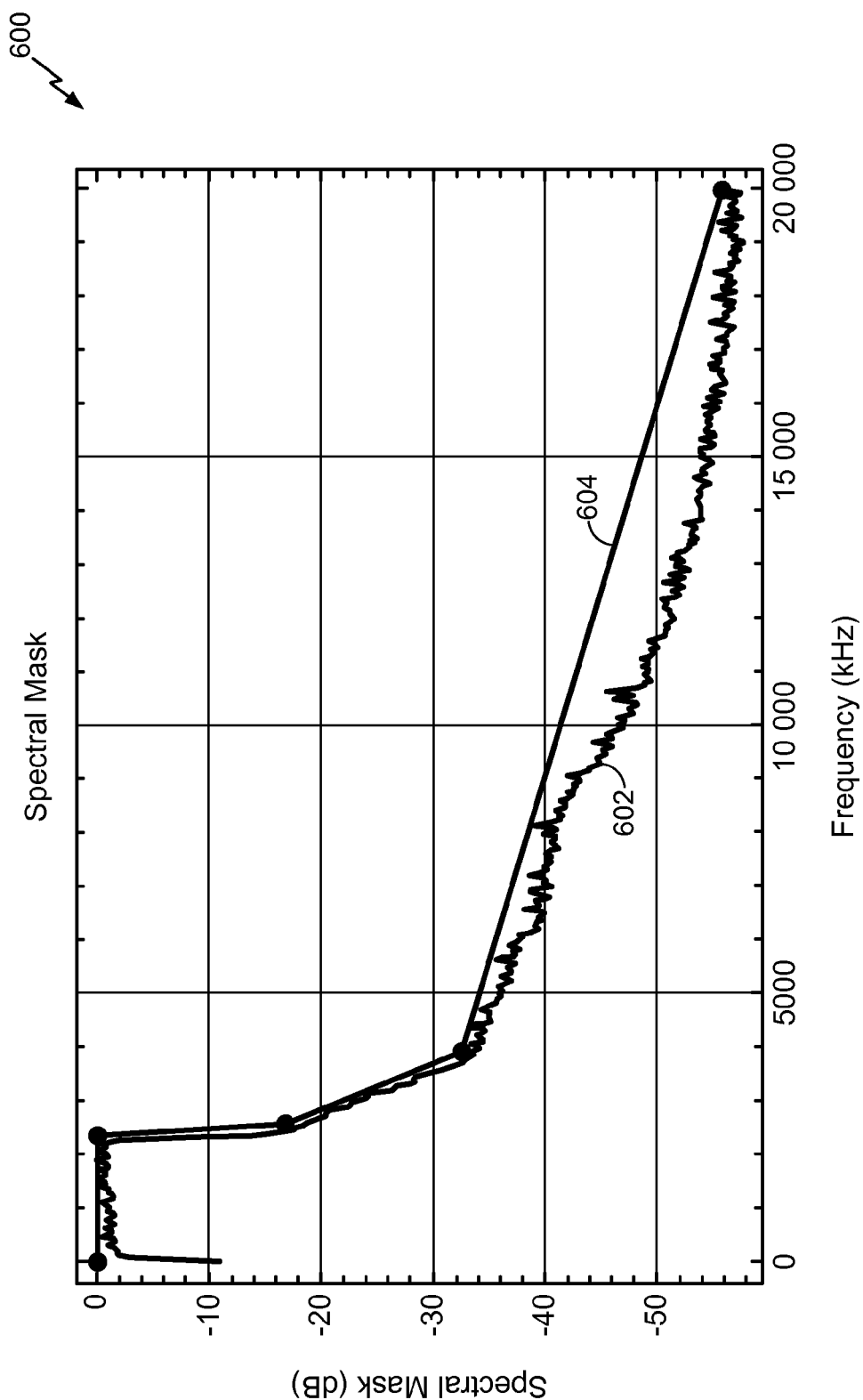
FIG. 6 is a graph illustrating an example of spectral mask and frequency points according to the disclosed embodiments.

Referring to FIG. 6, a spectral mask graph including a frequency component and a spectral mask component is disclosed and generally designated 600. The spectral mask graph 600 may be associated with any of the wireless devices 102a-102n or the access point 106. The spectral mask indicates a transmission curve (e.g., the spectral mask graph 600) that a particular wireless device may not exceed during transmission. The spectral mask includes an x-axis representing frequency in kHz and a y-axis representing the spectral mask in dB.

As illustrated in FIG. 6, the curve 602 indicates the actual spectral curve of the wireless device during operation (i.e., during transmission). The curve 604 indicates a representation of the actual spectral mask of the wireless device based on the curve 602. For example, using one or more interpolation or curve fitting methods (e.g., linear interpolation, polynomial interpolation, spline interpolation, etc), the actual spectral mask may be represented by the spectral mask curve 604 having five points, as shown. It should be noted that although FIG. 6 illustrates the curve 604 having five points, fewer or more points may be utilized. In addition, the curve 602 (i.e., actual spectral curve) does not exceed the interpolated curve 604 because the interpolated curve 604 represents an indicated spectral mask that the wireless device may not (or "promises" not to) exceed during transmission to prevent the wireless device from interfering with other devices transmitting in adjacent channels. Thus, the spectral mask points may be represented in the transmission characteristic field of the information element as described with reference to FIGS. 2-5 (i.e., using 4 octets or 3 octets).

Figure 7:
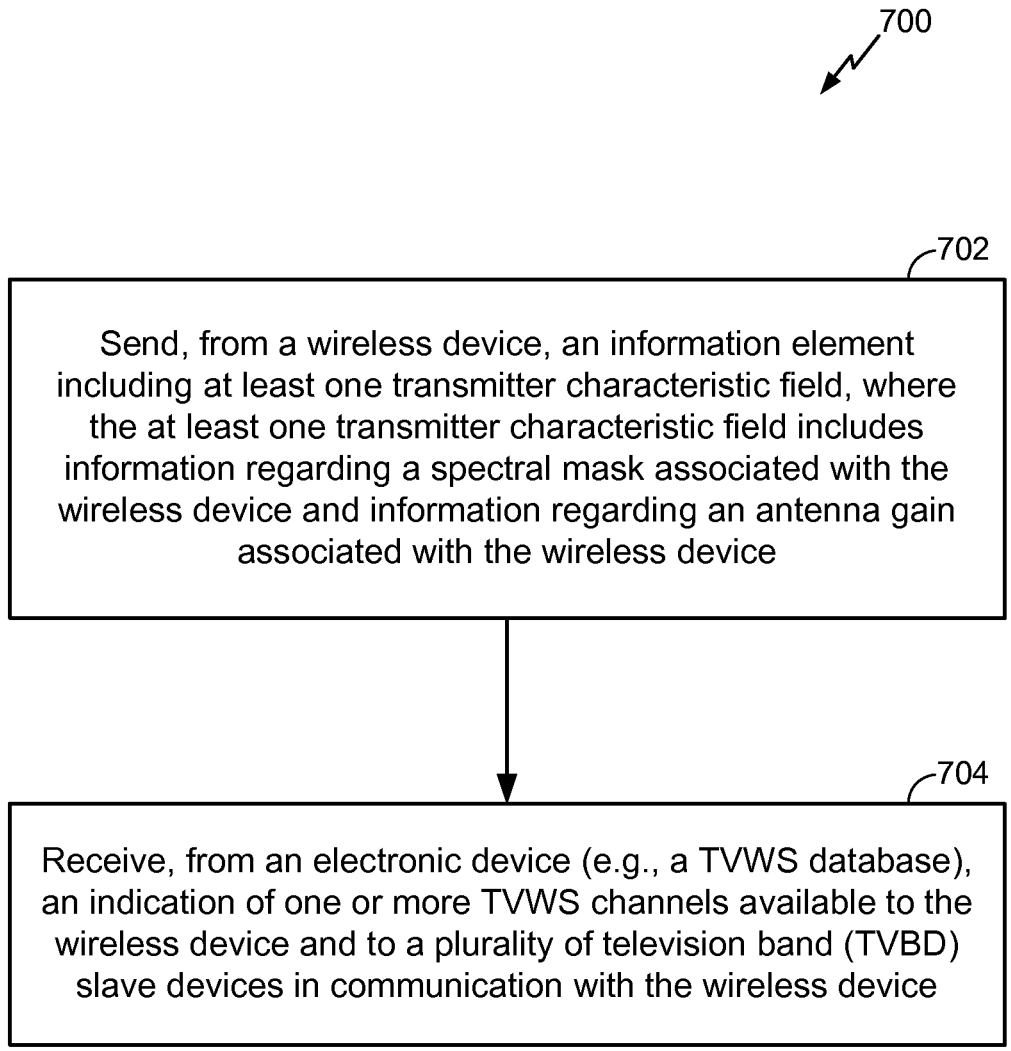
FIG. 7 is a flow chart of a first particular embodiment of a method of representing transmitter characteristics in an information element.

Referring to FIG. 7, a flow chart of a first particular embodiment of a method of representing transmitter characteristics in an information element is disclosed and generally designated 700. The method 700 may be performed by a wireless device or an access point, such as any of the wireless devices 102a-102n or the access point 106 of FIG. 1.

The method 700 includes sending, from a wireless device, an information element including at least one transmitter characteristic field, where the at least one transmitter characteristic field includes information regarding a spectral mask associated with the wireless device and information regarding an antenna gain associated with the wireless device, at 702. For example, wireless devices 102a-102n may send information elements 104a-104n to the access point 106. Alternately or in addition, the access point 106 may send the information elements 104a-104n (or an aggregate thereof) to the TVWS database 108. A representative information element 104 may include the transmitter characteristic field 140. The transmitter characteristic field 140 may include information regarding the spectral mask 150 and the antenna gain 148 associated with the particular wireless device. The spectral mask information may be usable to allocate one or more communication channels to the particular wireless device (e.g., a TVWS channel). In a particular embodiment, the spectral mask may be represented using 4 bytes (i.e., 4 octets) for each spectral mask point as described with references to FIGS. 2-3. In another particular embodiment, the spectral mask 150 may be represented using 3 bytes (i.e., 3 octets) for each spectral point, as described with reference to FIGS. 4-5.

The method 700 also includes receiving, from an electronic device, an indication of one or more TVWS channels (i.e., 802.11af channels) available to the wireless device and to a plurality of TVBD slave devices in communication with the wireless device, at 704. For example, the TVWS database 108 may allocate one or more available TVWS channels to the wireless devices 102a-102n and to the access point 106. The TVWS database 108 may send an indication of the one or more available TVWS channels to the access point 106.

Figure 8:
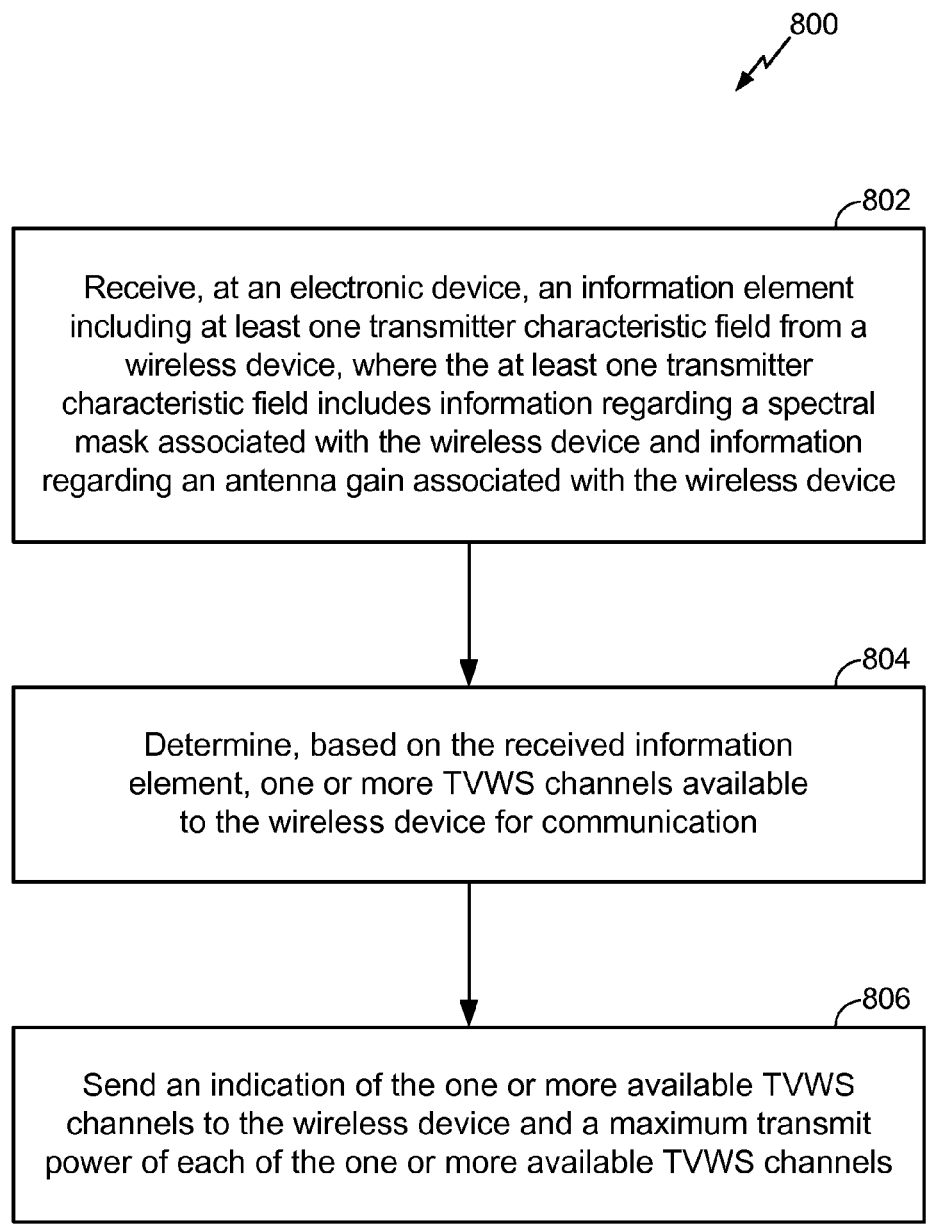
FIG. 8 is a flow chart of a second particular embodiment of a method of representing transmitter characteristics in an information element.

Referring to FIG. 8, a flow chart of a second particular embodiment of a method of representing transmitter characteristics in an information element for television white space is disclosed and generally designated 800. The method 800 may be performed by an electronic device, such as the TVWS database of FIG. 1.

The method 800 includes receiving, at an electronic device, an information element including at least one transmitter characteristics field from a wireless device, where the at least one transmitter characteristics includes information regarding a spectral mask associated with the wireless device and information regarding an antenna gain associated with the wireless device, at 802. For example, the TVWS database 108 may receive the information element 104 corresponding to any of the wireless devices 102a-102n or corresponding to the access point 106 from the access point 106.

The method also includes determining, based on the received information element, one or more TVWS channels (e.g., IEEE 802.11af-compliant channels) available to the wireless device for communication, at 804. For example, the TVWS database 108 may determine, based on the spectral mask information and the antenna gain information associated with the wireless device, one or more TVWS channels to allocate to the wireless device. The spectral mask information and antenna gain information may be included in a transmitter characteristic field of the information element.

The method further includes sending an indication of the one or more available TVWS (e.g., IEEE 802.11af-compliant) channels to the wireless device, at 806. For example, the TVWS database 108 may send an indication of the one or more available channels to the access point 106 that may be used by the access point 106 and the wireless devices 102a-102n for communication, and may also provide a maximum transmit power on each channel.

Figure 9:
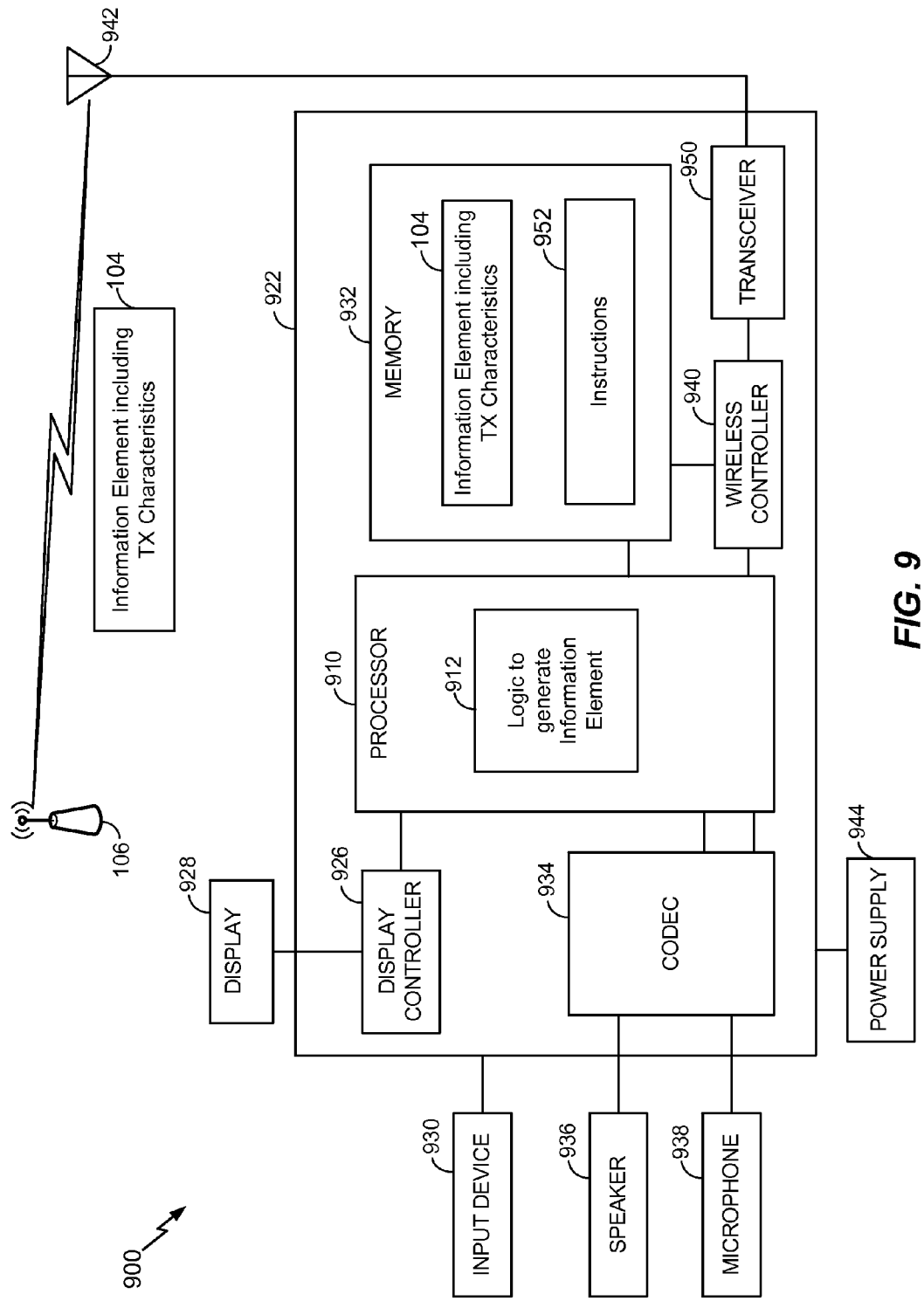
FIG. 9 is a block diagram of a particular embodiment of a wireless device including a processor operable to generate and initiate sending of an information element including transmitter characteristics.

Referring to FIG. 9, a block diagram of a particular illustrative embodiment of a wireless device including a processor operable to generate and initiate sending of an information element that includes transmitter characteristics is disclosed and generally designated 900. The device 900 includes a processor, such as a processor 910, coupled to a memory 932. The processor 910 may include logic 912 to generate an information element (e.g., the information element 104 of FIGS. 1, 2, and 4).

The memory 932 may be a non-transitory computer-readable or processor-readable storage medium that stores data, instructions (e.g., program code), or both. In a particular embodiment, the memory 932 may include instructions 952 that may be executable by the processor 910 to cause the processor 910 to perform or more functions of the device 900. For example, the instructions 952 may include user applications, an operating system, or other executable instructions, or a combination thereof. The instructions 952 may be executable by the processor 910 to cause the processor 910 to perform at least a portion of the functionality described with respect to any of FIGS. 1-7. For example, the instructions 952 may include instructions that are executable by a computer (e.g., the processor 910) to cause the computer to perform the method 700 of FIG. 7. Further, the memory may store the information element 104 generated by the logic 912.

In a particular embodiment, the logic 912 of the processor 910 may be configured to generate an information element (e.g., the information element 104 of FIGS. 1, 2 and 4). The information element 104 may include at least one transmitter characteristic field (e.g., the transmitter characteristic field 140 of FIGS. 2 and 4). The transmitter characteristics field 140 may include information regarding a spectral mask and an antenna gain associated with the device 900. For example, the transmitter characteristic field may include the spectral mask field 150 and the antenna gain field 148 of FIGS. 2 and 4. The processor 910 may also be configured to initiate sending of an information element and to detect receipt of an information element.

In a first embodiment, the spectral mask 150 information may be compactly and accurately represented in the transmitter characteristic field 140 of the information element 104 using 4 bytes (i.e., 4 octets). In a second particular embodiment, the spectral mask information may be compactly and accurately represented using 3 bytes (i.e., 3 octets). The spectral mask information includes a frequency value and a spectral mask value. In the first embodiment, the frequency value is measured at 1 kHz resolution and represented as a 16-bit unsigned integer, and the spectral mask value is measured at 0.01 dB resolution and represented as a 16-bit signed integer. In the second embodiment, the frequency value is measured at 1 kHz resolution and represented as a 16-bit unsigned integer, and the spectral mask value is measured at 1 dB resolution and represented as an 8-bit unsigned integer.

FIG. 9 also shows a display controller 926 that may be coupled to the processor 910 and to a display 928. A coder/decoder (CODEC) 934 (e.g., an audio and/or voice CODEC) may be coupled to the processor 910. A speaker 936 and a microphone 938 may be coupled to the CODEC 934. FIG. 9 also indicates that a wireless controller 940 may be coupled to the processor 910 and to a transceiver 950 that is coupled to a wireless antenna 942. In a particular embodiment, the processor 910 may initiate sending of the information element 104 from the device 900 to an access point (e.g., the access point 106 of FIG. 1) or to a TVWS database (e.g., the TVWS database 108 of FIG. 1).

In a particular embodiment, the processor 910, the display controller 926, the memory 932, the CODEC 934, the wireless controller 940, and the transceiver 950 are included in a system-in-package or system-on-chip device 922.

In a particular embodiment, an input device 930 and a power supply 944 are coupled to the system-on-chip device 922. Moreover, in a particular embodiment, as illustrated in FIG. 9, the display 928, the input device 930, the speaker 936, the microphone 938, the wireless antenna 942, and the power supply 944 are external to the system-on-chip device 922. However, each of the display 928, the input device 930, the speaker 936, the microphone 938, the wireless antenna 942, and the power supply 944 can be coupled to a component of the system-on-chip device 922, such as an interface or a controller.

It should be noted that although FIG. 9 depicts a wireless communications device, the processor 910 and the memory 932 may be integrated into other devices, such as a multimedia player, an entertainment unit, a navigation device, a personal digital assistant (PDA), a fixed location data unit, or a computer (e.g., a tablet computer, a laptop computer, a desktop computer, etc), a media device, a router or gateway device, or another device configured to wirelessly communicate data.

In conjunction with the described embodiments, an apparatus is disclosed that includes means for storing an information element including at least one transmitter characteristics field, where the at least one transmitter characteristics field includes information regarding a spectral mask associated with a wireless device. For example, the means for storing the information element may include a component (e.g., a memory) of the wireless devices 102 of FIG. 1, memory 136 of FIG. 1, the TVWS database 108 of FIG. 1, the memory 932 of FIG. 9, one or more other devices configured to store an information element, or any combination thereof. The apparatus also includes means for sending the information element to an electronic device. For example, the means for sending may include a component (e.g., a network interface) of any of the wireless devices 102 of FIG. 1, the network interface 116 of FIG. 1, the transceiver 950 of FIG. 9, the antenna 942 of FIG. 9, one or more other devices configured to send an information element, or any combination thereof.

In a particular embodiment, an apparatus includes means for receiving an information element that includes at least one transmitter characteristic field. The at least one transmitter characteristic field includes information regarding a spectral mask associated with a wireless device and information regarding an antenna gain associated with the wireless device. For example, the means for receiving may include a component (e.g., a network interface) of any of the wireless devices 102 of FIG. 1, the network interface 116 of FIG. 1, the transceiver 950 of FIG. 9, the antenna 942 of FIG. 9, one or more other devices configured to receive an information element, or any combination thereof. The apparatus also includes means for storing the information element. For example, the means for storing may include a component (e.g., a memory) of any of the wireless devices 102 of FIG. 1, the memory 136 of FIG. 1, the TVWS database 108 of FIG. 1, the memory 932 of FIG. 9, one or more other devices configured to store an information element, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   sending, from a wireless device, an information element comprising at least one transmitter characteristic field, wherein the at least one transmitter characteristic field includes information regarding a spectral mask associated with the wireless device and information regarding an antenna gain associated with the wireless device, and wherein the spectral mask is represented by a set of value pairs, each value pair in the set of value pairs including a frequency value and a spectral mask value.

2. The method of claim 1, wherein the wireless device includes a television band device.

3. The method of claim 1, wherein the information element is usable to determine one or more television white space (TVWS) channels to allocate to the wireless device.

4. The method of claim 3, wherein the one or more TVWS channels are compliant with an Institute of Electrical and Electronics Engineers (IEEE) 802.11af protocol.

5. The method of claim 1, wherein the frequency value is measured at 1 kilohertz resolution and the spectral mask value is measured at 0.01 decibel resolution.

6. The method of claim 5, further comprising representing the frequency value as a sixteen bit unsigned integer and representing the spectral mask value as a sixteen bit signed integer.

7. The method of claim 1, wherein the frequency value is measured at 1 kilohertz resolution and the spectral mask value is measured at 1 decibel resolution.

8. The method of claim 7, further comprising representing the frequency value as a sixteen bit unsigned integer and representing the spectral mask value as an eight bit unsigned integer.

9. The method of claim 8, wherein the eight bit unsigned integer represents a negative value of the spectral mask value.

10. The method of claim 1, wherein the spectral mask value is scaled to a maximum value of 0 decibels.

11. The method of claim 1, wherein the information element further comprises an element identification field, a length field, and a control field.

12. The method of claim 11, wherein the control field indicates a format of the at least one transmitter characteristic field, wherein the format includes an interpolation method for the spectral mask, and wherein the interpolation method includes linear interpolation, piecewise constant interpolation, polynomial interpolation, spline interpolation, cosine interpolation, cubic interpolation, Hermite interpolation, wavelet interpolation, or any combination thereof.

13. The method of claim 1, wherein the at least one transmitter characteristic field further includes a length field, a start field, and a stop field.

14. The method of claim 13, wherein the length field is an unsigned eight bit integer indicating a length of the at least one transmission characteristic field.

15. The method of claim 14, wherein the start field indicates a start channel number of a plurality of wireless local area network (WLAN) channels, and wherein the stop field indicates a stop channel number of the plurality of WLAN channels.

16. The method of claim 13, wherein the start field indicates a start channel number of a plurality of wireless local area network (WLAN) channels and wherein the stop field indicates a stop channel number of the plurality of WLAN channels.

17. The method of claim 1, wherein the antenna gain is represented as a signed sixteen bit integer indicating a maximum antenna gain of a transmitter of the wireless device and wherein the antenna gain is represented in 0.01 decibel isotropic resolution.

18. The method of claim 1, wherein the wireless device comprises a television band (TVBD) master device and wherein a plurality of TVBD slave devices is in communication with the TVBD master device.

19. The method of claim 18, further comprising:
sending, from the TVBD master device, information elements associated with the TVBD master device and the plurality of TVBD slave devices to a television white space (TVWS) database; and
receiving, from the TVWS database, an indication of one or more TVWS channels available to the TVBD master device and to the plurality of TVBD slave devices.

20. The method of claim 19, further comprising receiving, from the TVWS database, a maximum transmit power associated with each of a plurality of TVWS channels.

21. The method of claim 19, further comprising sending, from the TVBD master device to the plurality of TVBD slave devices, the indication of one or more TVWS channels.

22. The method of claim 1, wherein the wireless device comprises a television band (TVBD) slave device and further comprising:
sending, from the TVBD slave device, the information element associated with the TVBD slave device to a TVBD master device; and
receiving, from the TVBD master device, an indication of one or more television white space (TVWS) channels available to the TVBD slave device for communication.

23. A method comprising:
receiving, at an electronic device, an information element comprising at least one transmitter characteristic field from a wireless device, wherein the at least one transmitter characteristic field includes information regarding a spectral mask associated with the wireless device and information regarding an antenna gain associated with the wireless device, and wherein the spectral mask is represented by a set of value pairs, each value pair in the set of value pairs including a frequency value and a spectral mask value.

24. The method of claim 23, wherein the electronic device is a television band (TVBD) master device in communication with a plurality of TVBD slave devices.

25. The method of claim 23, wherein the electronic device comprises a television white space (TVWS) database.

26. The method of claim 25, further comprising:
determining, based on the received information element, one or more TVWS channels available to the wireless device for communication; and
sending, to the wireless device, an indication of the one or more TVWS channels.

27. An apparatus comprising:
a processor; and
a memory comprising instructions executable by the processor to:
initiate sending of an information element comprising at least one transmitter characteristic field, wherein the at least one transmitter characteristic field includes information regarding a spectral mask associated with a wireless device and information regarding an antenna gain associated with the wireless device, and wherein the spectral mask is represented by a set of value pairs, each value pair in the set of value pairs including a frequency value and a spectral mask value.

28. An apparatus comprising:
a processor; and
a memory comprising instructions executable by the processor to:
detect receipt of an information element comprising at least one transmitter characteristic field from a wireless device, wherein the at least one transmitter characteristic field includes information regarding a spectral mask associated with the wireless device and information regarding an antenna gain associated with the wireless device, and wherein the spectral mask is represented by a set of value pairs, each value pair in the set of value pairs including a frequency value and a spectral mask value.

29. An apparatus comprising:
means for storing an information element comprising at least one transmitter characteristic field, wherein the at least one transmitter characteristic field includes information regarding a spectral mask associated with a wireless device and information regarding an antenna gain associated with the wireless device, and wherein the spectral mask is represented by a set of value pairs, each value pair in the set of value pairs including a frequency value and a spectral mask value; and
means for sending the information element to an electronic device.

30. An apparatus comprising:
means for receiving an information element comprising at least one transmitter characteristic field from a wireless device, wherein the at least one transmitter characteristic field includes information regarding a spectral mask associated with the wireless device and information regarding an antenna gain associated with the wireless device, and wherein the spectral mask is represented by a set of value pairs, each value pair in the set of value pairs including a frequency value and a spectral mask value; and
means for storing the information element.

31. A non-transitory computer-readable medium including program code that, when executed by a processor, causes the processor to:
initiate sending of an information element comprising at least one transmitter characteristic field, wherein the at least one transmitter characteristic field includes information regarding a spectral mask associated with a wireless device and information regarding an antenna gain associated with the wireless device, and wherein the spectral mask is represented by a set of value pairs, each value pair in the set of value pairs including a frequency value and a spectral mask value.

32. A non-transitory computer-readable medium including program code that, when executed by a processor, causes the processor to:
detect receipt of an information element comprising at least one transmitter characteristic field from a wireless device, wherein the at least one transmitter characteristic field includes information regarding a spectral mask associated with the wireless device and information regarding an antenna gain associated with the wireless device, and wherein the spectral mask is represented by a set of value pairs, each value pair in the set of value pairs including a frequency value and a spectral mask value.

33. A method comprising:

sending, from a wireless device, an information element comprising at least one transmitter characteristic field, wherein the wireless device includes a television band (TVBD) slave device, wherein the at least one transmitter characteristic field includes information regarding a spectral mask associated with the wireless device, and wherein the spectral mask is represented by a set of value pairs, each value pair in the set of value pairs including a frequency value and a spectral mask value.

* * * * *